(12) United States Patent
Li et al.

(10) Patent No.: US 11,591,221 B2
(45) Date of Patent: Feb. 28, 2023

(54) MICROPOROUS CARBON NANOSPHERE, METHOD FOR SYNTHESIZING AND ACTIVATING THEREOF, ACTIVATED MICROPOROUS CARBON NANOSPHERE AND METHOD FOR SYNTHESIZING THEREOF

(71) Applicant: National Chung Cheng University, Chiayi (TW)

(72) Inventors: Yuan-Yao Li, Chia-Yi (TW); Cheng-Yen Tsai, Tainan (TW); Li-Ming Chiang, Kaohsiung (TW)

(73) Assignee: NATIONAL CHUNG CHENG UNIVERSITY, Chiayi (TW)

( * ) Notice: Subject to any disclaimer, the term of this patent is extended or adjusted under 35 U.S.C. 154(b) by 529 days.

(21) Appl. No.: 16/588,075

(22) Filed: Sep. 30, 2019

(65) Prior Publication Data
US 2021/0070615 A1 Mar. 11, 2021

(30) Foreign Application Priority Data

Sep. 6, 2019 (TW) .................................. 108132317

(51) Int. Cl.
*C01B 32/18* (2017.01)
*B82Y 30/00* (2011.01)
*B82Y 40/00* (2011.01)

(52) U.S. Cl.
CPC ............. *C01B 32/18* (2017.08); *B82Y 30/00* (2013.01); *B82Y 40/00* (2013.01); *C01P 2006/16* (2013.01)

(58) Field of Classification Search
CPC ..................................................... C01B 32/18
See application file for complete search history.

(56) References Cited

U.S. PATENT DOCUMENTS

| 8,226,851 B2 * | 7/2012 | Harada ................. C09K 19/38 349/1 |
| 10,195,583 B2 * | 2/2019 | Costantino ............... C10L 3/06 |

* cited by examiner

*Primary Examiner* — Stuart L Hendrickson
(74) *Attorney, Agent, or Firm* — Muncy, Geissler, Olds & Lowe, P.C.

(57) ABSTRACT

This present invention provides a microporous carbon nanospheres, method for synthesizing and activating thereof, the method comprising: adding and mixing well deionized water, absolute ethanol, triblock copolymer, ammonia solution, resorcinol and formaldehyde solution; separating solid and liquid of the mixture solution, then drying the separated solid substrate to have a dried solid substrate; sintering the dried solid substrate surrounding by nitrogen twice and collecting microporous carbon nanospheres after cooling down. Further sintering to activate these microporous carbon nanospheres surrounding by carbon dioxide, and collecting activated microporous carbon nanospheres after cooling down. Microporous carbon nanospheres and activated microporous carbon nanospheres synthesized by this present invention have spherical structure, small size and high the specific surface area, and the process is simplified, cost-effective and environment-friendly.

8 Claims, 4 Drawing Sheets

MICROPOROUS CARBON NANOSPHERE, METHOD FOR SYNTHESIZING AND ACTIVATING THEREOF, ACTIVATED MICROPOROUS CARBON NANOSPHERE AND METHOD FOR SYNTHESIZING THEREOF

BACKGROUND OF THE INVENTION

Field of the Invention

The present invention relates to a nano carbon material, more particularly to a microporous carbon nanosphere, method for synthesizing and activating it, and an activated microporous carbon nanosphere and method for synthesizing it.

Description of the Prior Art

Nano carbon material is one of the most attractive, interesting and appealing to active research and development of industry in the recent trend of nanotechnology. The Stöber method is a major way to synthesizing carbon sphere in these years. But this method is time-consuming and cannot produce carbon nanospheres on large-scale because of the hot water shower step and in autoclave.

In addition, activated carbons are produced by activation reaction. This process is to remove surplus carbons in pores by chemicals to open and enlarge spaces of these pores to create more micropores for increasing the total pore volume and the specific surface area of these materials. However, this process usually comes byproducts which are difficult to remove, the effect of it would be influenced and the cost is expensive if using sodium hydroxide or potassium hydroxide as activator.

SUMMARY OF THE INVENTION

In light of the above-mentioned defects, this present invention provides a microporous carbon nanosphere and method for synthesizing thereof, which can produce microporous carbon nanospheres through a fast, easy, cost-effective and environment-friendly way.

In order to achieve the above objective, the present invention provides a method for synthesizing microporous carbon nanospheres comprising the following steps: (a) adding 0~70 ml deionized water, 0~70 ml absolute ethanol, 0~1 g triblock copolymer, 0.25~3.35 g ammonia solution, 0.5 g resorcinol and 0.763 g formaldehyde solution and mixing well to have a mixture solution; (b) separating solid and liquid of the mixture solution, and then drying the separated solid substrate to have a dried solid substrate; (c) sintering the dried solid substrate surrounding by nitrogen under the increasing temperature rate for 1° C. per minute until 350° C. lasting for 2 hours; and (d) sintering products from step (c) by the increasing temperature rate for 1° C. per minute until 700~1000° C. lasting for 4 hours, and collecting microporous carbon nanospheres after cooling down.

This present invention also provides an activated microporous carbon nanosphere and method for synthesizing thereof, which can produce activated microporous carbon nanospheres having spherical structure, small size and high the specific surface area through a fast, easy, cost-effective and environment-friendly way.

In order to achieve the above objective, the present invention provides a method for synthesizing activated microporous carbon nanospheres comprising the following steps: (a) adding 0~70 ml deionized water, 0~70 ml absolute ethanol, 0~1 g triblock copolymer, 0.25~3.35 g ammonia solution, 0.5 g resorcinol and 0.763 g formaldehyde solution and mixing well to have a mixture solution; (b) separating solid and liquid of the mixture solution, and then drying the separated solid substrate to have a dried solid substrate; (c) sintering the dried solid substrate surrounding by nitrogen under the increasing temperature rate for 1° C. per minute until 350° C. lasting for 2 hours; (d) sintering products from step (c) by the increasing temperature rate for 1° C. per minute until 700~1000° C. lasting for 4 hours; and (e) activating products from step (d) surrounding by carbon dioxide under the increasing temperature rate for 5° C. per minute until 800~1000° C. lasting for 1 hour 15 minutes, and collecting activated microporous carbon nanospheres after cooling down.

This present invention also provides a method for activating microporous carbon nanospheres, which can significantly increase the specific surface area of microporous carbon nanospheres after being activated without damaging original spherical structure of microporous carbon nanospheres, cost-effective and no byproducts.

In order to achieve the above objective, the present invention provides a method for activating microporous carbon nanospheres comprising the steps of activating microporous carbon nanospheres surrounding by carbon dioxide under the increasing temperature rate for 5° C. per minute until 800~1000° C. lasting for 1 hour 15 minutes, and collecting activated microporous carbon nanospheres after cooling down.

Microporous carbon nanospheres and activated microporous carbon nanospheres synthesized by above-mentioned methods have spherical structure, small size and high the specific surface area.

Accordingly, this present invention is based on modification of the Stöber method which discard the hot water bath process to synthesis microporous carbon nanospheres having spherical structure and sizes between 34.01 nm to 715.71 nm by simplified steps and rearrangement of the recipe for synthesizing the precursor. This synthesizing method is time-saving than prior well-known method and suitable for large-scaled production. Besides, this present invention synthesizes activated microporous carbon nanospheres by carbon dioxide activation process which can significantly increase the specific surface area after being activated without damaging original spherical structure of microporous carbon nanospheres. The specific surface area of these activated microporous carbon nanospheres have been observed over 3000 m$^2$/g. This activation process is not only low-costs but also no byproducts, more environment-friendly and suitable for large-scaled production than prior well-known chemical activation process.

BRIEF DESCRIPTION OF THE DRAWINGS

In FIG. 1, (a) shows the result under 700° C., (b) shows the result under 800° C., (c) shows the result under 900° C., (d) shows the result under 1000° C.

In FIG. 2, (a) shows the result under 700° C., (b) shows the result under 800° C., (c) shows the result under 900° C.

In FIG. 3, (a) shows the result under 800° C., (b) shows the result under 900° C., (c) shows the result under 1000° C.

In FIG. 4, (a) and (b) respectively show low-resolution and high-resolution TEM images of microporous carbon nanospheres, (c) and (d) respectively show low-resolution and high-resolution TEM images of activated microporous carbon nanospheres.

DETAILED DESCRIPTION OF THE EMBODIMENT OF THE INVENTION

1. Synthesization of Microporous Carbon Nanospheres

Figure 1:
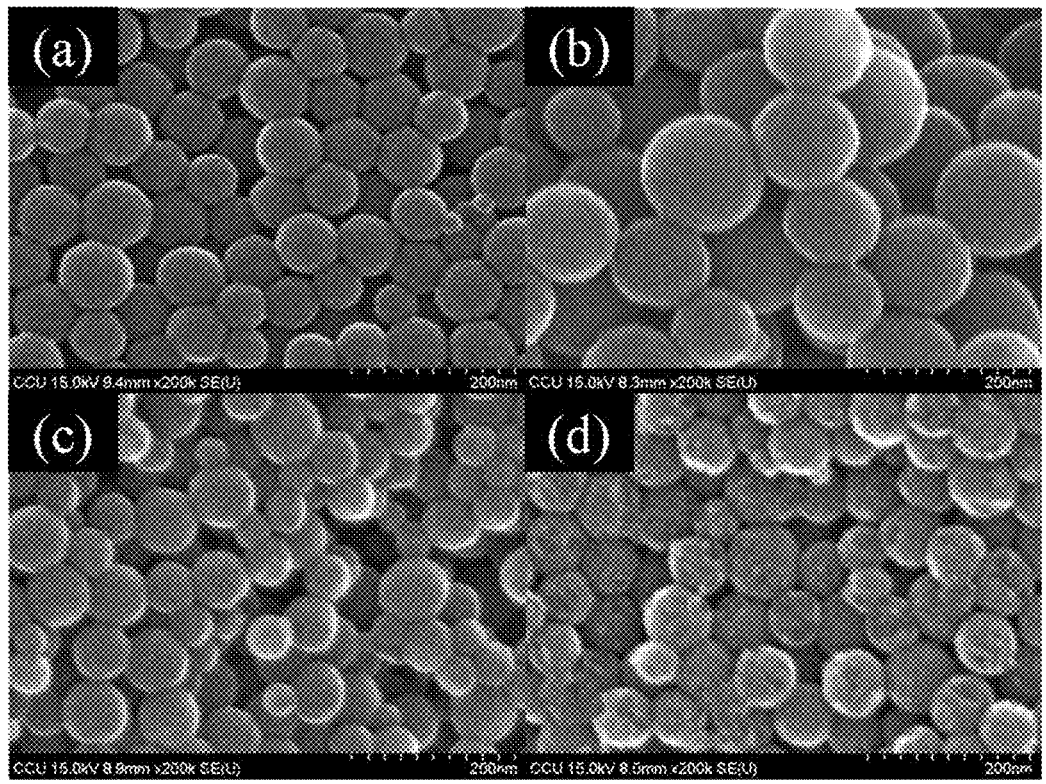
FIG. 1 is high-resolution SEM images of microporous carbon nanospheres synthesized from a preferred embodiment of the present invention under different temperatures by the carbonization reaction.

First of all, 50 ml deionized water and 20 ml absolute ethanol were added into a 500 ml bottle, then well stirred under room temperature by magnetic mixer. 0.25 g triblock copolymer F-127 ($PEO_{106}$-$PPO_{70}$-$PEO_{106}$, MW:14600, Aldrich) was added in it and kept stirring about 10 minutes till fully dissolved. After that, 0.5 g ammonia solution ($NH_3H_2O$, 25%, Choneye) was added and stirred about 30 minutes. Furthermore, 0.5 g resorcinol (99%, Alfa Aesar) was added into the mixture as carbon sources. 0.763 g formaldehyde solution (37 wt %, Aldrich) was dropped slowly and stirred to last for 24 hours at room temperature.

And then, the final mixture was centrifuged in centrifuge under 14900 rpm to separate solid and liquid. The separated solid substrate was dried in oven by 100° C. to have a dried solid substrate. The dried solid substrate was sintered in a tubular furnace surrounding by nitrogen for two steps. The first step was to remove the soft template constructed by F-127 under the increasing temperature rate for 1° C. per minute until 350° C. lasting for 2 hours. The second step was for carbonization reaction under the increasing temperature rate for 1° C. per minute until 700° C. to 1000° C. lasting for 4 hours. Microporous carbon nanospheres would be found after cooling down.

Formaldehyde and resorcinol come together become resin by polymerization reaction in ethanol and deionized water solution which full of hydrogen bonds and ammonia solution as a catalytic agent. Because the hydrophilic and hydrophobic characteristics of F-127, which gradually gather and become micelles. These micelles distribute over the polymerized resorcinol-formaldehyde resins to form soft templates. Finally, these soft templates be removed by heat treatment surrounding by nitrogen, and then carbonize the resorcinol-formaldehyde resins to gain microporous carbon nanospheres.

2. Activation of Microporous Carbon Nanospheres

Next, the potassium hydroxide and carbon dioxide activation were conducted respectively to activate microporous carbon nanospheres.

The potassium hydroxide activation, also called chemical activation, microporous carbon nanospheres produced by above-mentioned recipe and process under 800° C. for carbonization were used to proceed the following process. First of all, 1 g microporous carbon nanospheres, 4 g potassium hydroxide and 60 ml deionized water were put into a round bottom flask. Then, the round bottom flask was heated in the oil bath to 80° C. and stirring last for 2 hours by magnetic mixer. After that, the solution was steamed till dry in the oven under 100° C., then put it into the tubular furnace and activated surrounding by argon under the increasing temperature rate for 5° C. per minute until 700° C., 800° C., 900° C. lasting for 1 hour 15 minutes. The products were washed by large amount of deionized water to remove extra potassium hydroxide and miscellaneous, and then these activated microporous carbon nanospheres would be found.

The carbon dioxide activation, also called physical activation, microporous carbon nanospheres produced by above-mentioned recipe and process under 800° C. for carbonization were used to proceed the following process. The microporous carbon nanospheres going through carbonization reaction and cooling down until room temperature were put into the tubular furnace again and sintered surrounding by carbon dioxide under increasing temperature rate for 5° C. per minute until 800° C., 900° C., 1000° C. lasting for 1 hours 15 minutes. Activated microporous carbon nanospheres would be found after cooling down.

3. Detection and Analyzation Instruments

The instruments used to analyze characteristics of material are introduced as following. The surface structure of produced microporous carbon nanospheres were observed by field-emission scanning electron microscopy (FE-SEM, Hitachi S-4800) and transmission electron microscope (TEM, FEI E.O Tecnai F20 G2 MAT S-TWIN). The particle size of carbon nanospheres were measured by software Image J. The specific surface area of carbon nanospheres were calculated by Brunauer-Emmett-Teller (BET) analyzer (Micrometric, ASAP 2020) by measuring adsorption and desorption amounts of nitrogen. However, in other embodiment of this present invention, these instruments are not limited to above-mentioned specific serial types.

4. Analyzation of Microporous Carbon Nanospheres' Sizes from Different Synthetizing Conditions Microporous carbon nanospheres from above-mentioned different temperatures during carbonization reaction were observed by SEM. The result of FIG. 1 can be observed that the carbon nanospheres having spherical structure can be produced successfully under 700° C. and the appearance of the carbon nanospheres produced under 700° C., 800° C. and 900° C. had no significant differences. But there were obviously damages on the surface of the carbon nanospheres under 1000° C. form high-high-resolution SEM images. The size of these carbon nanospheres were measured by Image J and the result shows that the average size was 91.29 nm.

Adjustment of the ratio and concentration of ammonia solution, F-127, ethanol and water could change the size of microporous carbon nanospheres. There were 12 microporous carbon nanosphere samples, MCS-1 to MCS-12, in this experiment to perform a test under 800° C. at second step of sinteration by different ratio and concentration. Wherein, the condition of MCS-2, MCS-7, MCS-9 were identical to be the control group in different subgroups. The size of these carbon nanospheres were measured by Image J. The results show as the following Table 1.

TABLE 1 size of microporous carbon nanospheres from different synthesizing conditions

| Sample | | F-127 (g) | NH₃H₂O (g) | Ethanol (mL) | Water (mL) | Resorcinol (g) | Formaldehyde solution (mL) | Particle Size (nm) |
|---|---|---|---|---|---|---|---|---|
| MCS-1 | Effect | 0.25 | 0.25 | 20 | 50 | 0.5 | 0.763 | 57.630 |
| MCS-2 | of | 0.25 | 0.50 | 20 | 50 | 0.5 | 0.763 | 91.290 |
| MCS-3 | NH₃H₂O | 0.25 | 1.95 | 20 | 50 | 0.5 | 0.763 | 120.66 |
| MCS-4 | | 0.25 | 3.35 | 20 | 50 | 0.5 | 0.763 | 41.250 |
| MCS-5 | Effect | 0 | 0.50 | 20 | 50 | 0.5 | 0.763 | 715.71 |
| MCS-6 | of | 0.125 | 0.50 | 20 | 50 | 0.5 | 0.763 | 147.19 |
| MCS-7 | F127 | 0.25 | 0.50 | 20 | 50 | 0.5 | 0.763 | 91.290 |
| MCS-8 | | 1 | 0.50 | 20 | 50 | 0.5 | 0.763 | 55.190 |
| MCS-9 | Effect of | 0.25 | 0.50 | 20 | 50 | 0.5 | 0.763 | 91.290 |
| MCS-10 | Ethanol/ | 0.25 | 0.50 | 35 | 35 | 0.5 | 0.763 | 5470 |
| MCS-11 | water | 0.25 | 0.50 | 0 | 70 | 0.5 | 0.763 | 34.010 |
| MCS-12 | ratio | 0.25 | 0.50 | 70 | 0 | 0.5 | 0.763 | — |

When ammonia solution added into the water which is in abundance of carbonyl groups, amino groups and hydroxyl groups, cross-link of resorcinol-formaldehyde resins will be formed rapidly and construct a sphere structure. Therefore, ammonia solution plays an important role in the reaction to form the sphere structure and the concentration of ammonia solution would affect the size of these microporous carbon nanospheres. According to the results of MCS-1 to MCS-4 shown from Table 1, adding 0.25 g to 3.35 g ammonia solution could produce microporous carbon nanospheres spread from 41.25 nm to 120.66 nm of their sizes.

At the same time, this experiment also illustrates the change of concentration of triblock copolymer F-127 to the size of these microporous carbon nanospheres. As the results of MCS-5 to MCS-8 shown from Table 1, adding 0 g to 1 g F-127 could produce microporous carbon nanospheres which spread from 715.71 nm to 55.19 nm of their sizes. There is a significant tendency that the higher of the concentration of F-127, the smaller of the average size of these microporous carbon nanospheres.

The change of ethanol/water ratio also affected the size of these microporous carbon nanospheres. As the results of MCS-9 to MCS-12 shown from Table 1, when the volume ratio of ethanol/water was 0.4, 1 or no ethanol, microporous carbon nanospheres produced would spread from 715.71 nm to 55.19 nm of their sizes.

5. Analyzation of Microporous Carbon Nanospheres' and Activated Microporous Carbon Nanospheres' Specific Surface Area Microporous carbon nanospheres produced by above-mentioned synthesization processes were activated under different temperature by above-mentioned potassium hydroxide and carbon dioxide activation processes, and then analyzed and observed the differences.

Figure 2:
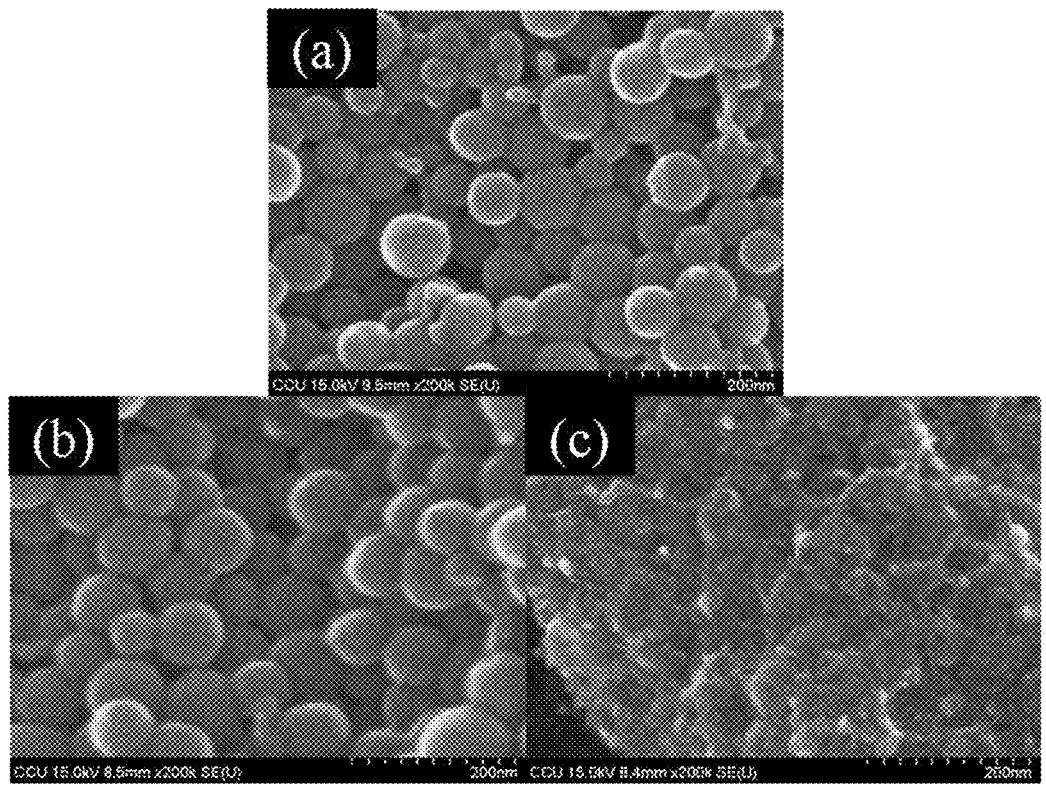
FIG. 2 is high-resolution SEM images of activated microporous carbon nanospheres synthesized from a preferred embodiment of the present invention by potassium hydroxide activation reaction.
Figure 3:
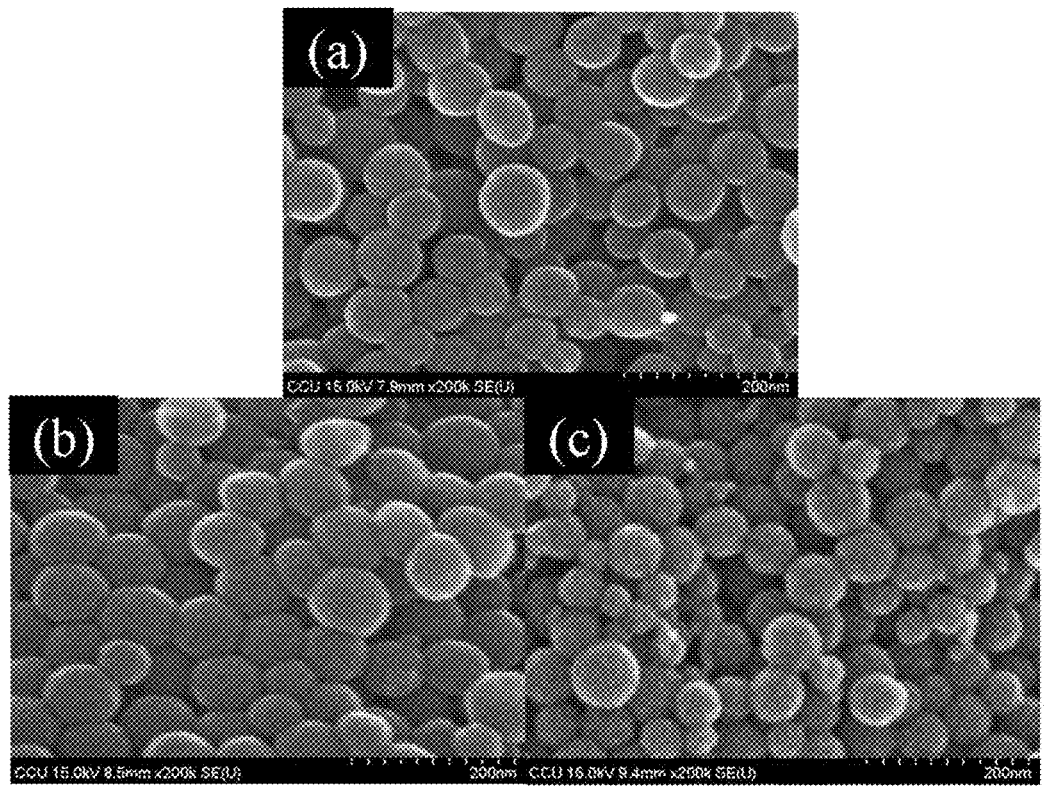
FIG. 3 is high-resolution SEM images of activated microporous carbon nanospheres synthesized from a preferred embodiment of the present invention by carbon dioxide activation reaction.

In FIG. 2, (a) to (c) are high-resolution SEM images of activated microporous carbon nanospheres synthesized from the chemical activation reaction under 700° C., 800° C. and 900° C. These images can be observed that the damages on the spherical surface of carbon nanospheres were getting more when the activation temperature was getting higher. The spherical shape of these activated microporous carbon nanospheres were almost totally destroyed under 900° C. In FIG. 3, (a) to (c) are high-resolution SEM images of activated microporous carbon nanospheres synthesized from the physical activation reaction under 800° C., 900° C. and 1000° C. These images can be observed that carbon dioxide activation would not damage spherical structure of microporous carbon nanospheres and these pores were significantly increased after carbon dioxide activation process under 1000° C. The size of these carbon nanospheres were measured by Image J and the result shows that the average size was 52.09 nm. The formula $$\frac{1}{V\left[\left(\frac{P_0}{P}\right)\right]} = \frac{C-1}{V_m C}\left(\frac{P}{P_0}\right) + \frac{1}{V_m C}$$

were utilizing to calculate the specific surface area of microporous carbon nanospheres and activated microporous carbon nanospheres, wherein P is the equilibrium pressure, $P_0$ is the saturation vapor pressure, V is the equilibrium adsorbed gas quantity, $V_m$ is the monolayer adsorbed gas quantity, C is the BET constant and according to the formula $$C = \exp\left(\frac{E_1 - E_L}{RT}\right),$$

wherein E1 is the heat of adsorption for the first layer, EL is the heat of adsorption for the monolayer of the other layers. The specific surface area of microporous carbon nanospheres under different carbonization temperature and activated microporous carbon nanospheres synthesized from different activation reactions and conditions. The results show as the following Table 2, wherein the MSC-800 were synthesized under 800° C. during the second step of sinteration. The MSC-800 were further activated by carbon dioxide and potassium hydroxide activation processes respectively, the carbon dioxide activation was conducted under 800° C., 900° C. and 1000° C. (AMSC-800, AMSC-900, AMSC-1000) and the potassium hydroxide activation was conducted under 700° C. and 800° C. (AMSC-700 and AMSC-800).

TABLE 2

Analyzation of microporous carbon nanospheres' and activated microporous carbon nanospheres' specific surface area

| Samples | $S_{BET}$ | $S_{mic}$ | $S_{mic}/S_{BET}$ (%) | $V_t$ | $V_{mic}$ | $V_{mic}/V_t$ (%) |
|---|---|---|---|---|---|---|
| Carbonization | | | | | | |
| MCS-800 | 446.55 | 401.74 | 89.96 | 0.393 | 0.209 | 53.18 |
| $CO_2$ activation | | | | | | |
| ACMCS-800 | 503.19 | 449.99 | 89.42 | 0.414 | 0.233 | 56.28 |
| ACMCS-900 | 841.55 | 775.38 | 92.13 | 0.639 | 0.401 | 57.86 |
| ACMCS-1000 | 3259.12 | 2478.17 | 84.32 | 2.44 | 1.41 | 57.78 |
| KOH activation | | | | | | |
| ACMCS-700 | 957.65 | 777.53 | 81.19 | 0.787 | 0.454 | 57.43 |
| ACMCS-800 | 1667.79 | 1522.18 | 91.26 | 1.214 | 0.799 | 65.81 |

$S_{BET}$, BET specific area;
$S_{mic}$, surface area corresponding to micropores;
$V_t$, total pore volume;
$V_{mic}$, micropores volume.

The experiment results illustrate that the carbon dioxide activation reaction not only could maintain the spherical structure of these activated microporous carbon nanospheres intact, but also increase the specific surface area effectively. For example, according to ACM-1000 from Table 2 can demonstrate that maximum $S_{BET}$ of activated microporous carbon nanospheres by carbon dioxide activation is at 1000° C. which indicates that carbon dioxide activation needs high temperature. Besides, comparison of MCS-800 carbonized at 800° C. between activated ACM-1000, $S_{BET}$ of microporous carbon nanospheres significantly increased from 446.55 m²/g to 3259.12 m²/g after carbon dioxide activation process which was raised about 7.3 times. Therefore, the carbon dioxide activation is preferable to synthesize microporous carbon nanospheres with high $S_{BET}$. Using t-plot method to calculate the total pore volume, the total pore volume of MCS-800 was 0.393 m²/g and ACMS-1000 was 2.44 cm²/g. It was raised about 6.2 times. Table 2 shows that ratio of the micropores volume and the total pore volume of ACMS-800, ACMS-900 and ACMS-1000 were over about 56% which indicates that there were mainly micropores in the activated microporous carbon nanospheres. In conclusion, the favorable synthesization condition of the activated microporous carbon nanospheres were carbonized at 800° C. during the second step of sinteration with carbon dioxide activation at 1000° C.

Figure 4:
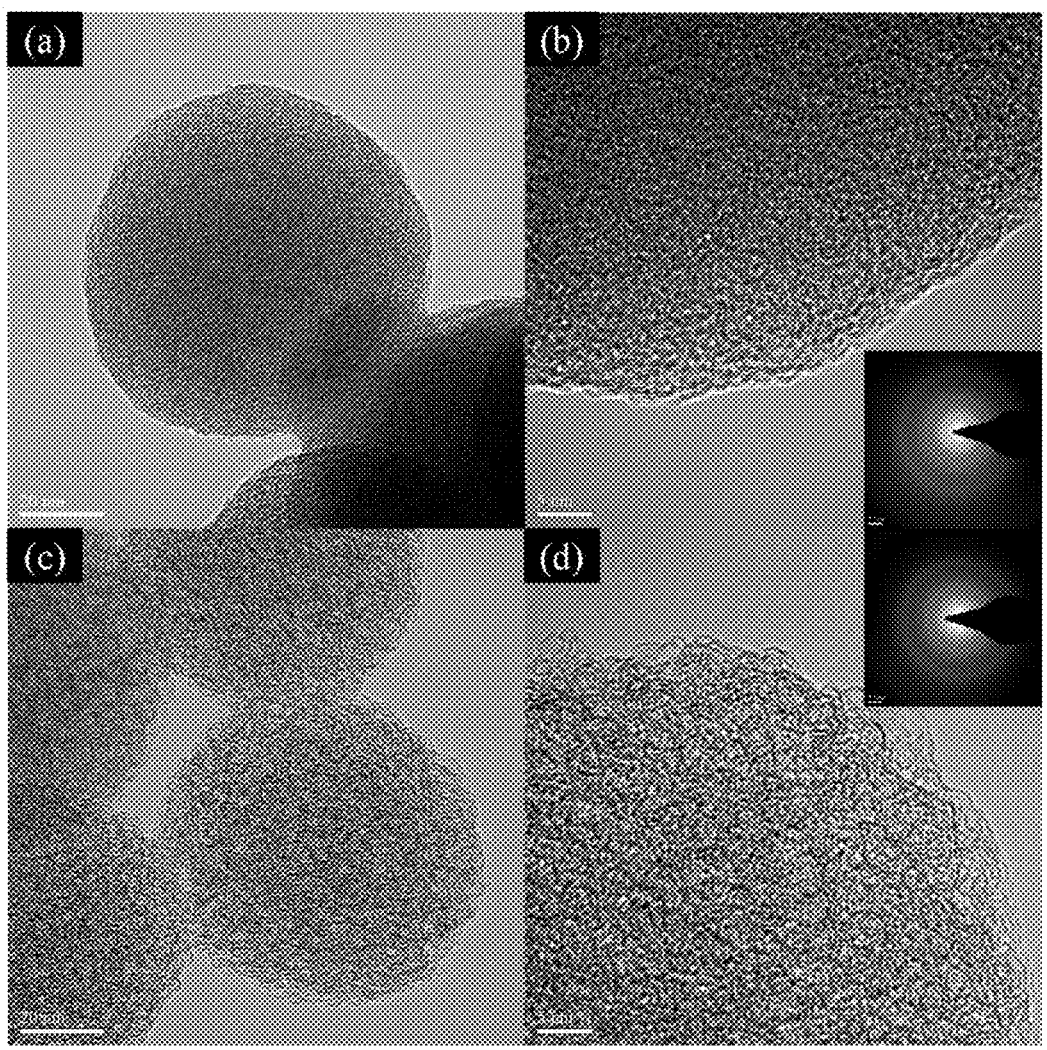
FIG. 4 is TEM images of microporous carbon nanospheres and activated microporous carbon nanospheres synthesized from a preferred embodiment of the present invention.

For further understanding the characteristics of these microporous carbon nanospheres, which synthesized by carbonizing at 800° C. during the second step of sinteration with carbon dioxide activation at 1000° C. were observed under TEM. In FIG. 4, (a) and (b) respectively show low-resolution and high-resolution TEM images of microporous carbon nanospheres. In FIG. 4, (c) and (d) respectively show low-resolution and high-resolution TEM images of activated microporous carbon nanospheres. The white spots in these images are pores of carbon nanospheres, comparison of the number of pores before and after the activation process could conclude the differences. Observation of SEM images could understand that carbon dioxide activation would cause the loss of carbon and let these carbon nanospheres become small. TEM images could further illustrate that the density of these carbon nanospheres also become much smaller than it before, which indicates these carbon nanospheres became much more porous after the activation process. These images show that these pores ware spread irregularly, but the increasing of these pores are beneficial for mass transport of the matters in the material and expression of its applications.

This present invention is based on modification of the Stöber method which discard the hot water bath process to synthesis microporous carbon nanospheres having spherical structure and sizes between 34.01 nm to 715.71 nm by simplified steps and rearrangement of the recipe for synthesizing the precursor. This synthesizing method is time-saving and cost-effective than prior well-known method and suitable for large-scaled production. Besides, this present invention synthesizes activated microporous carbon nanospheres by carbon dioxide activation process which can significantly increase the specific surface area after being activated without damaging original spherical structure of microporous carbon nanospheres. The specific surface area of these activated microporous carbon nanospheres have observed over 3000 m²/g. This activation process is not only low costs but also no byproducts, more environment-friendly and suitable for large-scaled production than prior well-known chemical activation process. Under one of the best conditions, size of the activated microporous carbon nanospheres synthesized by this present invention is 52.09 nm and the specific surface area of it is 3259 m²/g. these activated microporous carbon nanospheres are not only remained having spherical structure also small size and large the specific surface area.

The above detailed description, which is supported by drawings, is merely intended to provide an embodiment illustrative of the technical content and features of the present invention. The appended claims shall cover simple modifications, replacements or component reduction made, without going against the spirit embodied in the present invention, by persons skilled in the art after gaining insight into the technical content and features of the present invention.

What is claimed is:

1. A method for synthesizing activated microporous carbon nanospheres, comprising the following steps:
   (a) adding 0-70 ml deionized water, 0-70 ml absolute ethanol, 0-1 g triblock copolymer, 0.25-3.35 g ammonia solution, 0.5 g resorcinol and 0.763 g formaldehyde solution and mixing to have a mixture solution;
   (b) separating solid and liquid of the mixture solution, and then drying the separated solid substrate to have a dried solid substrate;
   (c) sintering the dried solid substrate in nitrogen under the increasing temperature rate of 1° C. per minute until 350° C. for 2 hours;
   (d) sintering products from step (c) by the increasing temperature rate of 1° C. per minute until 700-1000° C. lasting for 4 hours; and
   (e) activating products from step (d) in carbon dioxide under the increasing temperature rate of 5° C. per minute until 800-1000° C. for 1 hour 15 minutes, and collecting the activated microporous carbon nanospheres after cooling down;
   wherein a specific surface area of these activated microporous carbon nanospheres is at least 3259.12 m²/g and a total pore volume of the activated microporous carbon nanospheres is at least 2.44 cm²/g.

2. A method for synthesizing activated microporous carbon nanospheres of claim 1, wherein in step (d), a sintering temperature is 700° C., 800° C., 900° C. or 1000° C.

3. A method for synthesizing activated microporous carbon nanospheres of claim 1, wherein in step (e), an activating temperature is 800° C., 900° C. or 1000° C.

4. A method for synthesizing activated microporous carbon nanospheres of claim 1, wherein in step (d), a sintering temperature is 800° C. and an activating temperature is 1000° C. in step (e).

5. A method for synthesizing activated microporous carbon nanospheres of claim 1, wherein 50 ml deionized water is added and 20 ml absolute ethanol is added in step (a).

6. A method for synthesizing activated microporous carbon nanospheres of claim 1, wherein 0.25 g triblock copolymer is added in step (a).

7. A method for synthesizing activated microporous carbon nanospheres of claim 1, wherein 0.5 g ammonia solution is added in step (a).

8. The method for synthesizing activated microporous carbon nanospheres of claim 1, wherein in step (e), a size of the activated microporous carbon nanospheres is at least 52.09 nm.

* * * * *